United States Patent
Elzib et al.

(10) Patent No.: US 9,500,272 B2
(45) Date of Patent: Nov. 22, 2016

(54) AXLE CARRIER HOUSING WITH STRUCTURAL FEATURES

(71) Applicant: GM GLOBAL TECHNOLOGY OPERATIONS LLC, Detroit, MI (US)

(72) Inventors: Fawaz Elzib, Windsor (CA); Muftau M. Alabi, Rochester Hills, MI (US); David S. Schulz, Livonia, MI (US); Jinsha Li, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/657,658

(22) Filed: Mar. 13, 2015

(65) Prior Publication Data

US 2016/0265647 A1     Sep. 15, 2016

(51) Int. Cl.
| | |
|---|---|
| *F16H 57/02* | (2012.01) |
| *F16H 57/037* | (2012.01) |
| *F16H 57/032* | (2012.01) |
| *F16H 57/03* | (2012.01) |
| *F16H 57/021* | (2012.01) |

(52) U.S. Cl.
CPC .......... *F16H 57/037* (2013.01); *F16H 57/021* (2013.01); *F16H 57/03* (2013.01); *F16H 57/032* (2013.01)

(58) Field of Classification Search
CPC .... F16H 57/021; F16H 57/03; F16H 57/032; F16H 57/037; Y10T 74/2186; Y10T 74/2188; B60B 35/166
See application file for complete search history.

(56) References Cited

U.S. PATENT DOCUMENTS

| | | | | |
|---|---|---|---|---|
| 2,477,576 | A * | 8/1949 | Buckendale | F16H 57/037 74/607 |
| 5,655,418 | A | 8/1997 | Barnholt | |
| 5,839,327 | A | 11/1998 | Gage | |
| 6,398,689 | B1 * | 6/2002 | Morse | F16C 25/06 384/583 |
| 6,502,665 | B1 | 1/2003 | Brehob | |
| 6,997,284 | B1 * | 2/2006 | Nahrwold | F16H 57/0447 165/117 |
| 7,004,636 | B2 * | 2/2006 | Deschler | F16C 35/00 384/456 |
| 7,108,428 | B2 * | 9/2006 | Ason | F16C 25/06 29/898.09 |
| 7,115,059 | B2 * | 10/2006 | Petruska | F16H 57/029 475/230 |
| 7,175,560 | B2 * | 2/2007 | Petruska | F16C 25/08 384/557 |
| 7,866,433 | B2 * | 1/2011 | Martin, III | B60G 3/20 180/337 |
| D747,670 | S * | 1/2016 | Chung | D12/160 |
| 2014/0243140 | A1 | 8/2014 | Khatavkar et al. | |
| 2016/0009136 | A1 * | 1/2016 | Chung | B60K 23/00 475/230 |

* cited by examiner

*Primary Examiner* — Adam D Rogers
(74) *Attorney, Agent, or Firm* — Cantor Colburn LLP

(57) ABSTRACT

An axle carrier housing includes a center housing defining an internal chamber, a pinion nose extending from the center housing to a housing front end, the pinion nose defining a pinion chamber configured to house a pinion shaft assembly, the housing front end defining a shaft opening having a central axis, and a first axle tube extending from the center housing to a housing first side defining a first axle tube opening having a first axle axis that is generally perpendicular to the central axis. A second axle tube extends from the center housing to a housing second side that is opposite the housing first side, the second axle tube defining a second axle tube opening having a second axle axis that is concentric with the first axle axis. First and second transverse webs extend angularly from the pinion nose and the center housing.

16 Claims, 8 Drawing Sheets

US 9,500,272 B2

AXLE CARRIER HOUSING WITH STRUCTURAL FEATURES

FIELD OF THE INVENTION

The subject invention relates to motor vehicle drive axles and, more specifically, to a rear-beam axle carrier having structural ribbing and webbing.

BACKGROUND

A common motor vehicle drive axle may include a carrier housing or carrier, a pair of axle tubes on opposite sides of a center housing, and a pair of axle shafts rotatably supported and housed by the axle tubes. A gear-set in the center housing includes a pinion that connects a drive shaft to a differential assembly through the gear set. The differential assembly transmits torque and rotation to the axle shafts through pinions, and allows relative rotation between the wheels of the motor vehicle.

The axle carrier housing is typically fabricated from cast iron. However, cast iron is relatively heavy and adds weight to a vehicle, which reduces vehicle fuel efficiency. Accordingly, it is desirable to provide a carrier housing having significant mass reduction relative to a cast iron carrier housing and that is capable of handling high torque and rear vehicle sprung mass.

SUMMARY OF THE INVENTION

In one aspect, an axle carrier housing is provided. The axle carrier housing includes a center housing defining a housing rear end, and an internal chamber configured to house a differential gear assembly, a pinion nose extending from the center housing to a housing front end, the pinion nose defining a pinion chamber configured to house a pinion shaft assembly, the housing front end defining a shaft opening having a central axis, and a first axle tube extending from the center housing to a housing first side defining a first axle tube opening having a first axle axis that is generally perpendicular to the central axis. A second axle tube extends from the center housing to a housing second side that is opposite the housing first side, the second axle tube defining a second axle tube opening having a second axle axis that is concentric with the first axle axis. A first transverse web extends angularly from the pinion nose and the center housing between the housing front end and the housing first side, and a second transverse web extends angularly from the pinion nose and the center housing between the housing front end and the housing second side. The first and second transverse webs facilitate preventing torsional deflection of the axle carrier housing and deflection of the axle carrier housing in a fore/aft direction.

In another aspect, an axle carrier housing is provided. The axle carrier housing includes a center housing defining a housing rear end, and an internal chamber configured to house a differential gear assembly, a pinion nose extending from the center housing to a housing front end, the pinion nose defining a pinion chamber configured to house a pinion shaft assembly, the housing front end defining a shaft opening having a central axis, and a first axle tube extending from the center housing to a housing first side defining a first axle tube opening having a first axle axis that is generally perpendicular to the central axis. A second axle tube extends from the center housing to a housing second side that is opposite the housing first side, the second axle tube defining a second axle tube opening having a second axle axis that is concentric with the first axle axis. A first transverse web extends angularly from the pinion nose and the center housing between the housing front end and the housing first side. A second transverse web extends angularly from the pinion nose and the center housing between the housing front end and the housing second side. The first and second transverse webs facilitate preventing torsional deflection of the axle carrier housing and deflection of the axle carrier housing in a fore/aft direction. A plurality of upper stiffening ribs extend from an upper face of the pinion nose and the center housing between the housing front end and the housing rear end, the upper stiffening ribs configured to improve stiffness of the axle carrier housing and to dissipate heat generated in the axle carrier housing. A plurality of lower stiffening ribs extend from a lower face of the pinion nose and the center housing between the housing front end and the housing rear end, the lower stiffening ribs configured to improve stiffness of the axle carrier housing and to dissipate heat generated in the axle carrier housing. An upper radial web extends from the center housing, the first axle tube, and the second axle tube between the housing first side and the housing second side, the upper radial web configured to facilitate preventing deflection of the axle carrier housing in the fore/aft direction and in a vertical direction. A lower radial web extends from the center housing, the first axle tube, and the second axle tube between the housing first side and the housing second side, the lower radial web configured to facilitate preventing deflection of the axle carrier housing in the fore/aft direction and in a vertical direction.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DETAILED DESCRIPTION

Figure 1:
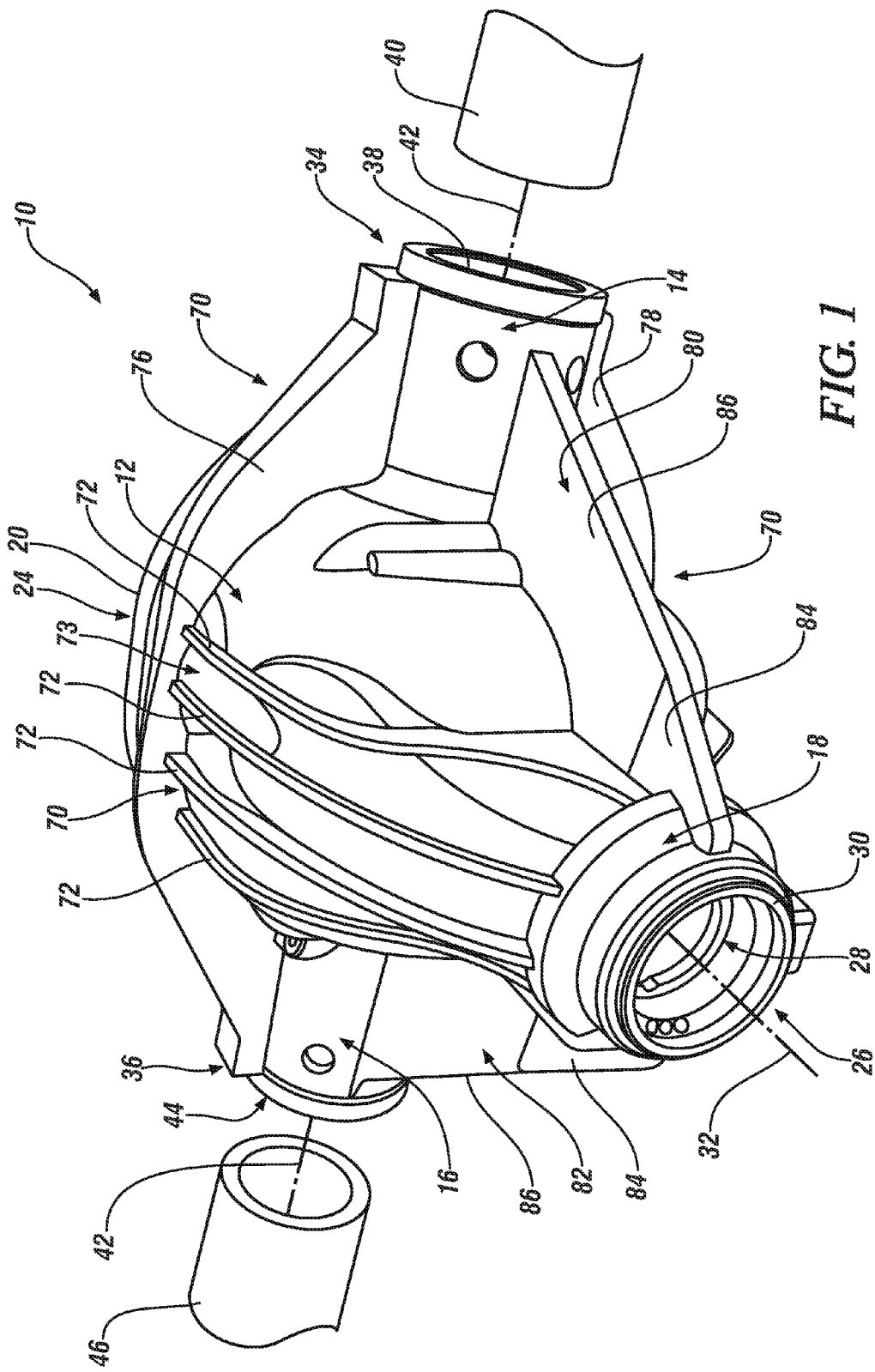
FIGS. 1-3 are perspective views of an exemplary axle carrier housing.
Figure 8:
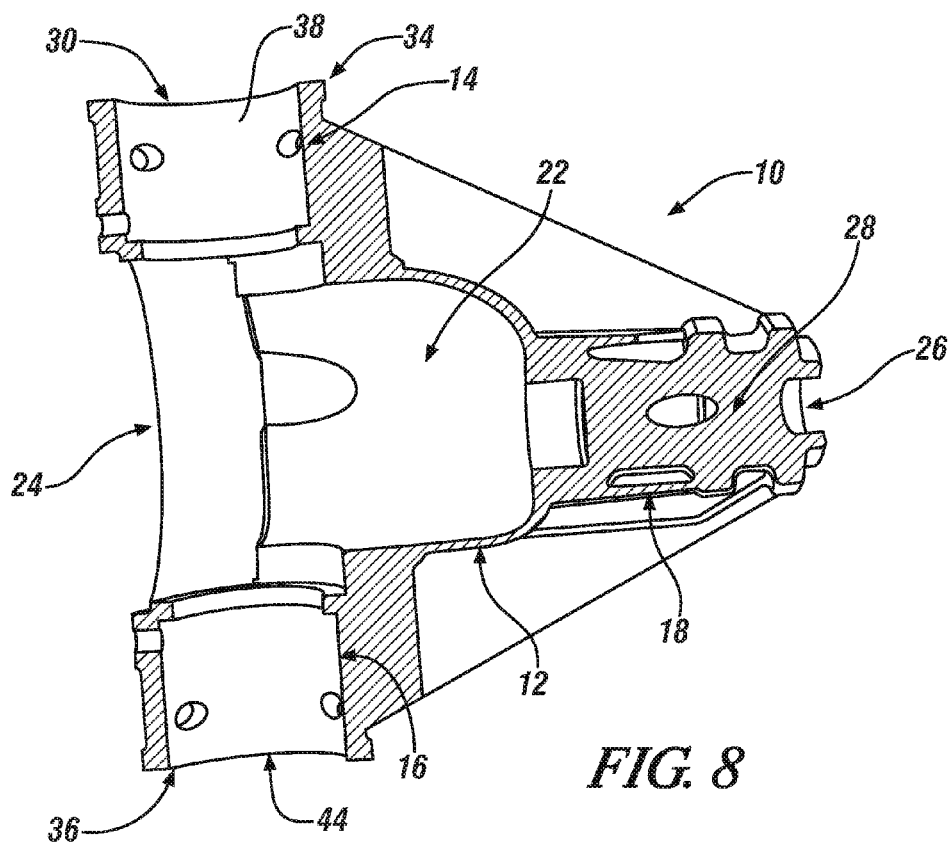
FIG. 8 is a perspective cross-sectional view of the axle carrier housing shown in FIG. 3 and taken along line 8-8.
Figure 9:
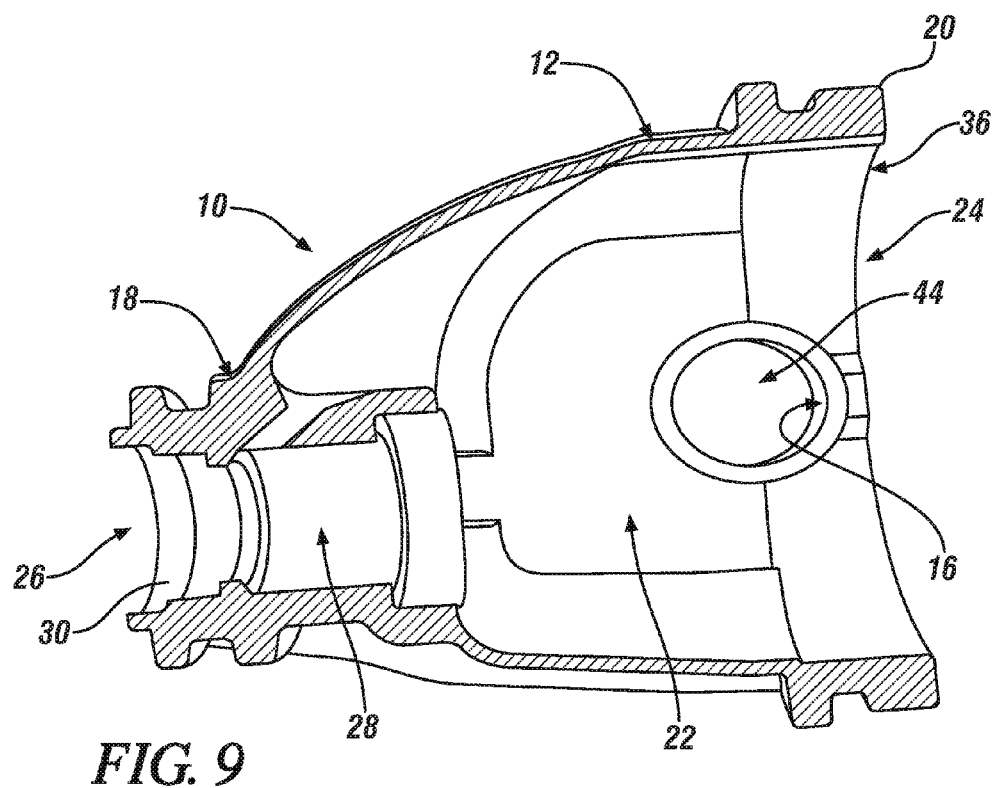
FIG. 9 is a perspective cross-sectional view of the axle carrier housing shown in FIG. 3 and taken along line 9-9.

FIG. 1 illustrates an exemplary motor vehicle rear-beam axle carrier housing 10 that generally includes a center housing 12, a pair of axle tubes 14, 16, a pinion nose 18, and a rear opening flange 20. FIGS. 2-11 illustrate various other views of carrier housing 10. With reference to FIGS. 8 and 9, center housing 12 defines an internal chamber 22 configured to house a differential gear assembly (not shown). Center housing 12 includes a carrier housing rear end 24 that defines rear opening flange 20, which is configured to couple to a carrier housing cover (not shown).

Pinion nose 18 extends from center housing 12 to a carrier housing forward end 26. Pinion nose 18 defines a pinion chamber 28 configured to house a pinion shaft assembly (not shown), which is configured to couple to a motor vehicle drive shaft (not shown). Carrier housing forward end 26 defines a drive shaft opening 30 having a central axis 32 that is concentric with a longitudinal axis of the vehicle drive shaft.

Axle tubes 14, 16 respectively define a housing left side 34 and a housing right side 36. Housing left side 34 defines an axle tube opening 38 configured to receive a first axle shaft 40 (FIG. 1) and having a axle axis 42 that is concentric with a longitudinal axis of first axle shaft 40. Similarly, housing right side 36 defines an axle tube opening 44 configured to receive a second axle shaft 46 (FIG. 1) and also having axle axis 42 that is concentric with a longitudinal axis of second axle shaft 46.

Axle carrier housing 10 is fabricated from aluminum or an aluminum alloy. Use of aluminum or aluminum alloy is critical to the manufacture because it provides significant mass reduction relative to a cast iron carrier housing. This mass reduction results in increased vehicle fuel efficiency. However, because aluminum and aluminum alloys may not have the same strength and rigidity as cast iron, structural and geometrical features are required in order for carrier housing 10 to handle high torque and rear vehicle weight in a manner similar to the cast iron housing. Accordingly, carrier housing 10 includes unique differential bearing bores 50 (FIG. 10), pinion bearing bores 60 (FIG. 11), and structural ribbing and webbing 70 (FIG. 1). Alternatively, other light-weight materials or alloys thereof may be used in the manufacture of carrier housing 10 to provide the benefits described herein. For example, carrier housing 10 may be fabricated from magnesium or a magnesium alloy.

Figure 10:
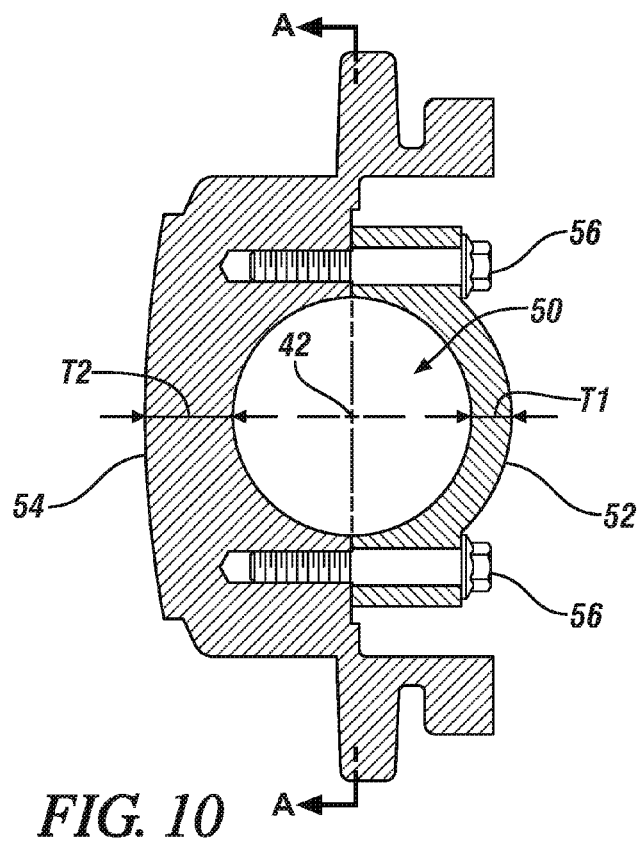
FIG. 10 is a cross-sectional view of an internal portion of the axle carrier housing taken along the line A-A in FIG. 7.

With reference to FIG. 10, differential bearing bores 50 are defined by a bearing cap 52 coupled to a bearing of housing 10 via fasteners 56. Bearing cap 52 and bearing portion 54 provide a press fit coupling for differential bearings (not shown). As such, the differential bearings are preloaded under all operating conditions by a press-fit to account for expansion of axle carrier housing 10 during heating. In the exemplary embodiment, the aluminum construction includes bearing cap 52 having a wall thickness 'T1' and housing bearing portion 54 having a thickness 'T2'. In the exemplary embodiment, thicknesses 'T1' and 'T2' are at least 6 mm.

Figure 11:
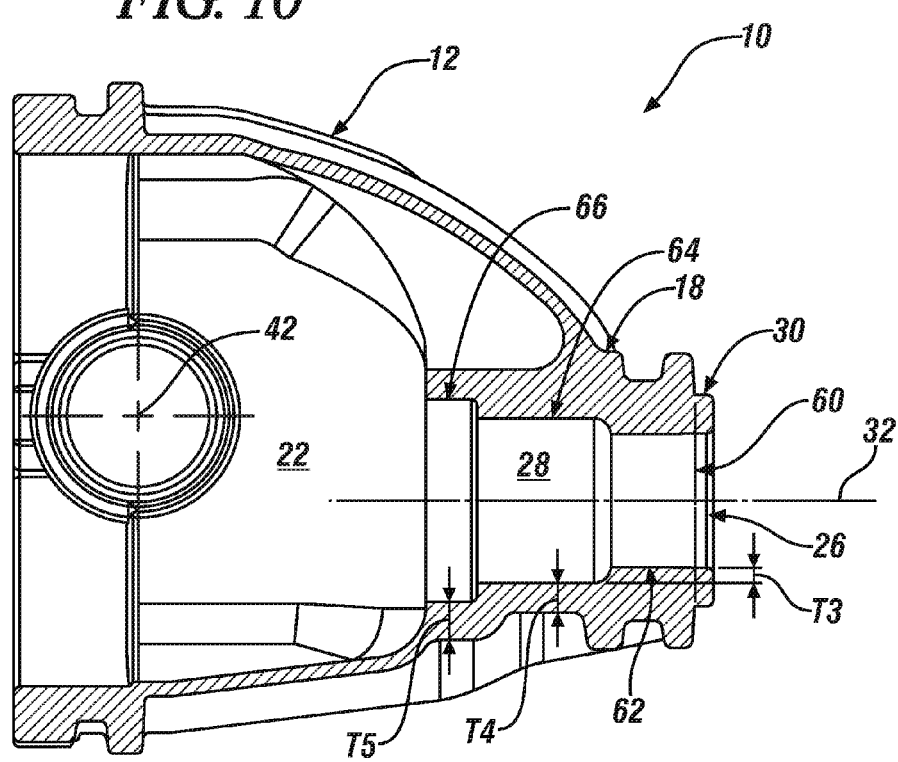
FIG. 11 is a cross-sectional view of the axle carrier housing shown in FIG. 3 and taken along line 11-11.

With reference to FIG. 11, pinion bearing bores 60 include a first diameter section 62, a second diameter section 64, and a third diameter section 66. Sections 62, 64, and 66 provide a press fit coupling for pinion bearings (not shown). As such, the pinion bearings are preloaded under all operating conditions by a press-fit. In the exemplary embodiment, the aluminum construction includes first diameter section 62 having a wall thickness of 'T3' of at least 6 mm, second diameter section 64 having a wall thickness of 'T4', and third diameter section 66 having a wall thickness of 'T5'. In the exemplary embodiment, thicknesses 'T3', 'T4, and 'T5' are at least 6 mm.

Aluminum carrier housing 10 includes structural ribbing and webbing 70. Specifically, carrier housing 10 includes upper stiffening ribs 72, lower stiffening ribs 74, an upper radial web 76, a lower radial web 78, and opposed transverse webs 80 and 82.

Figure 4:
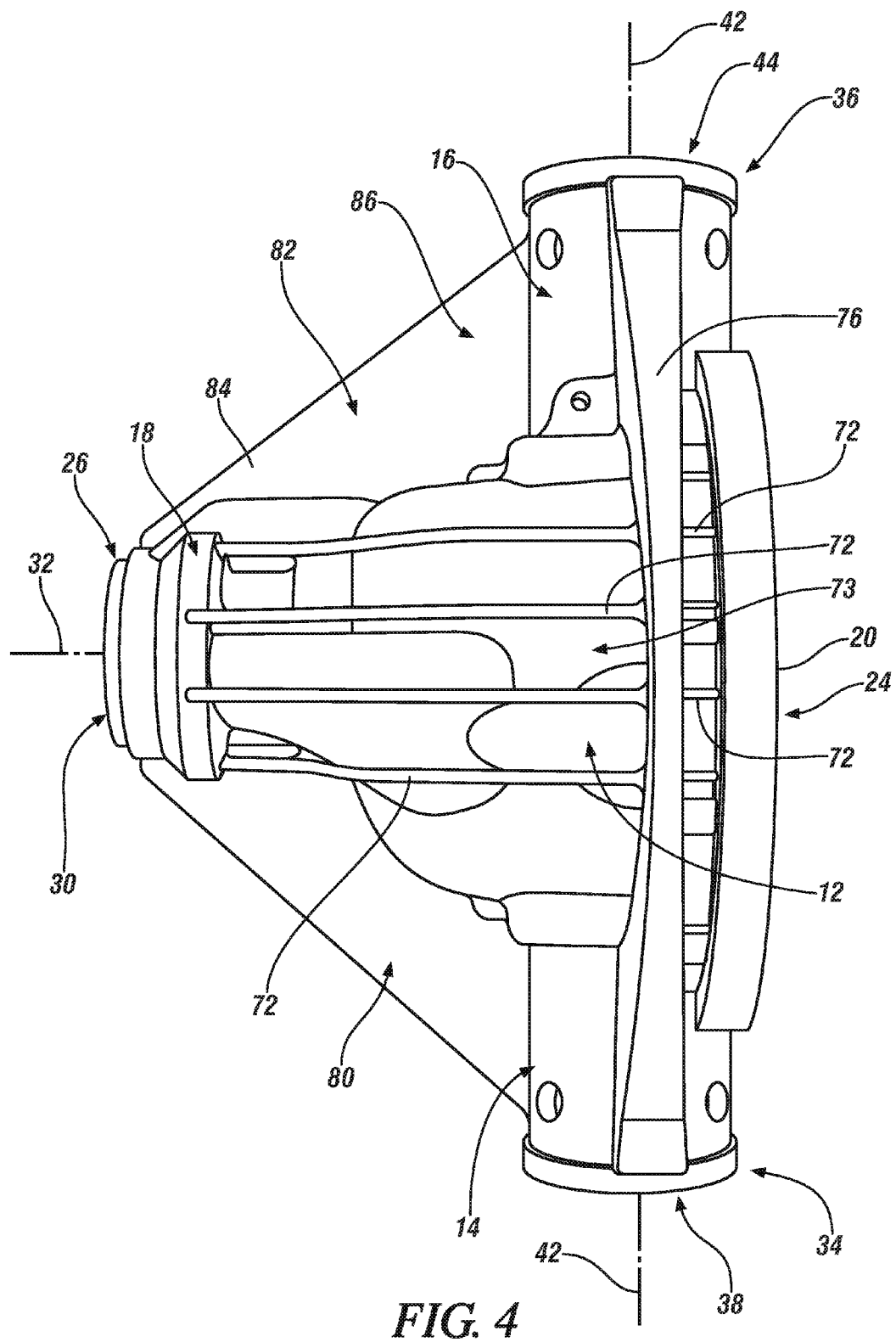
FIG. 4 is a top view of the axle carrier housing shown in FIGS. 1-3.
Figure 7:
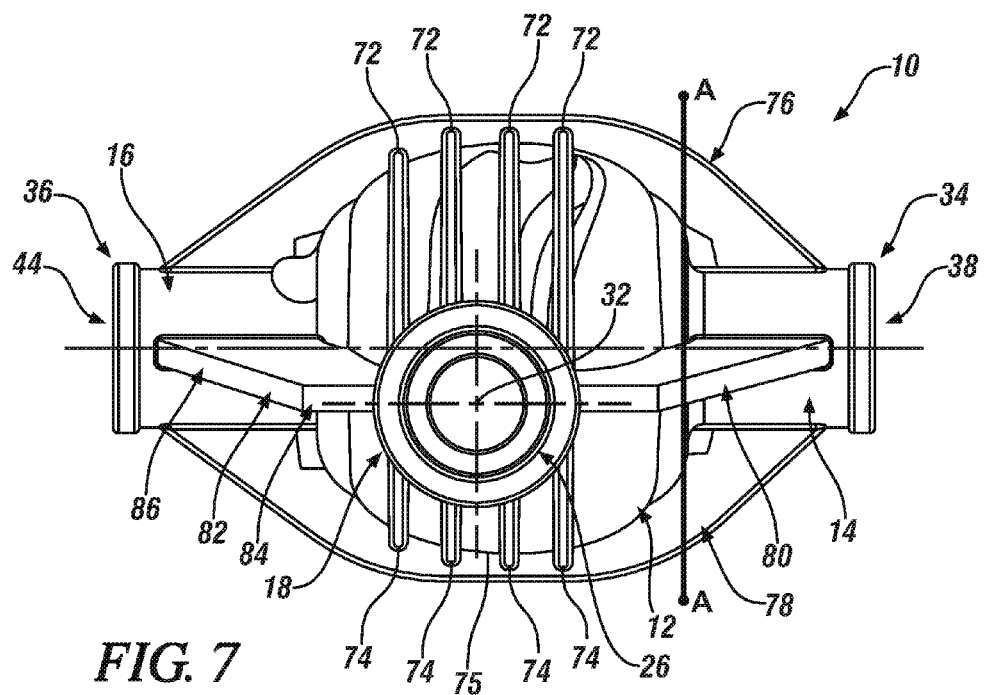
FIG. 7 is a front view of the axle carrier housing shown in FIGS. 1-3.

With reference to FIGS. 1, 4, and 7, upper stiffening ribs 72 are formed on and extend from an upper face 73 of center housing 12 and pinion nose 18. Upper stiffening ribs 72 extend from and between carrier housing front end 26 to carrier housing rear end 24 parallel to or substantially parallel to central axis 32. As shown in FIG. 4, upper radial web 76 may extend across, or intersect, upper stiffening ribs 72.

Figure 2:
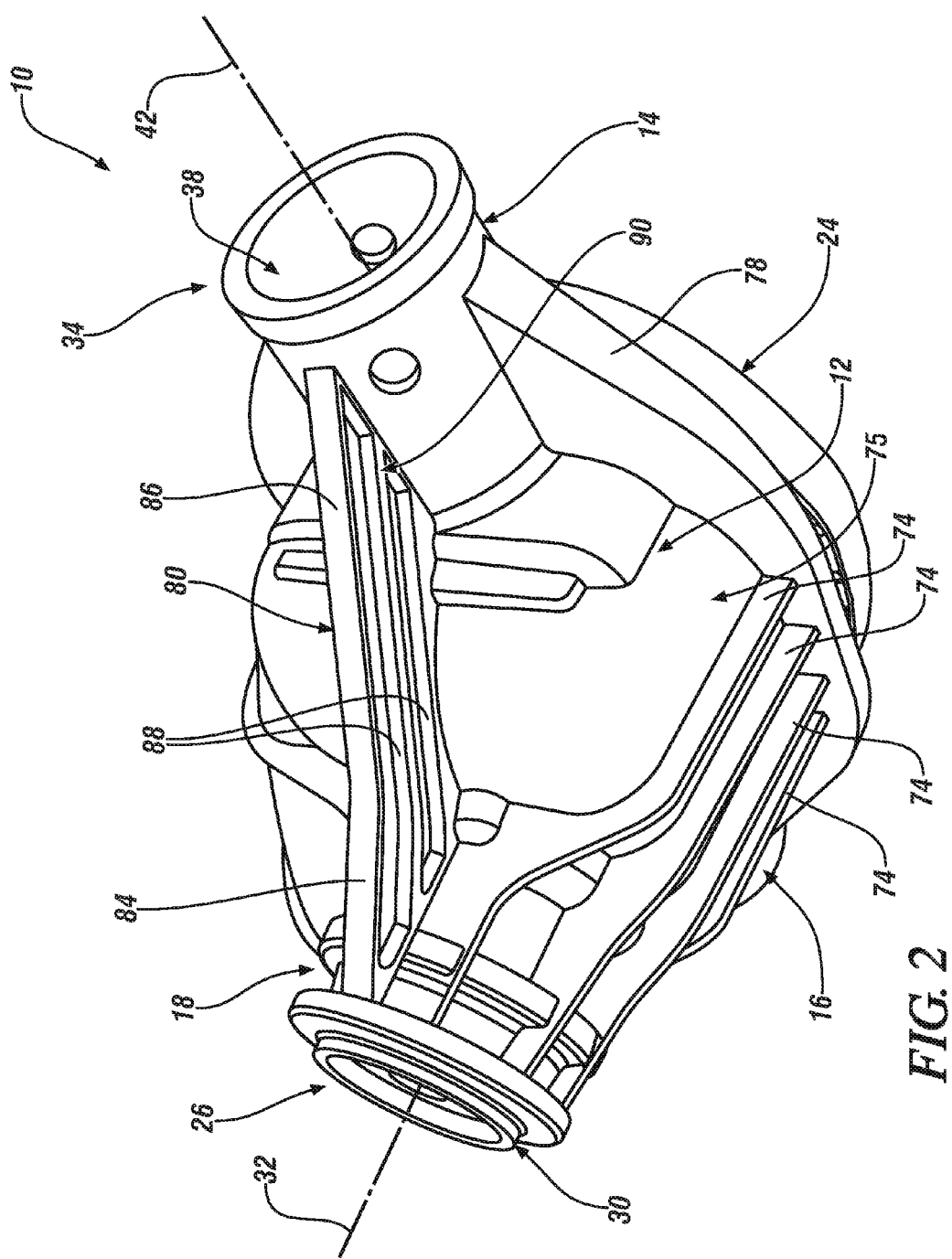
Figure 5:
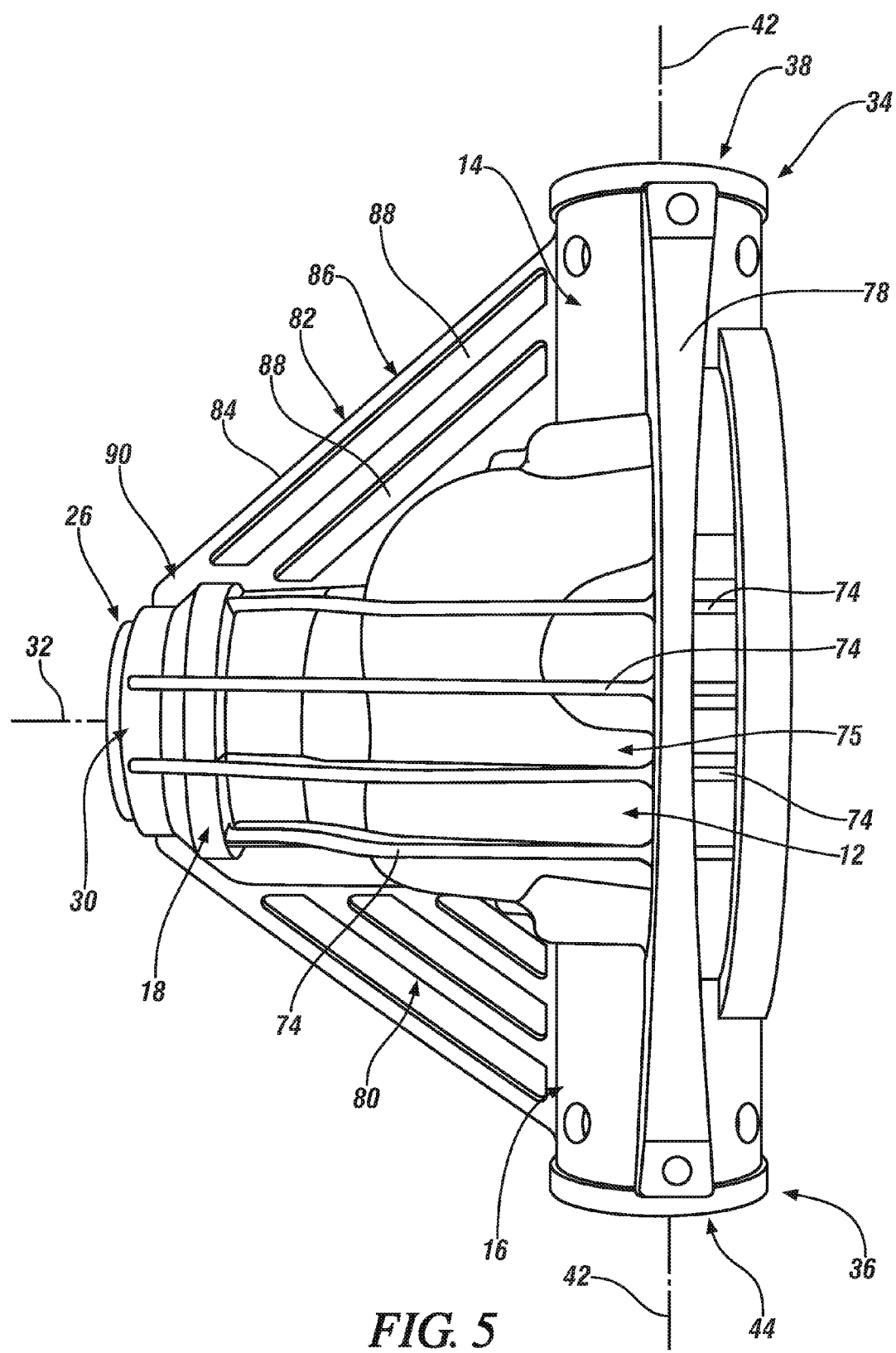
FIG. 5 is a bottom view of the axle carrier housing shown in FIG. 1-3.

With reference to FIGS. 2, 5, and 7, lower stiffening ribs 74 are formed on and extend from a lower face 75 of center housing 12 and pinion nose 18. Lower stiffening ribs 74 extend from and between carrier housing front end 26 to carrier housing rear end 24 parallel to or substantially parallel to central axis 32. As shown in FIG. 5, lower radial web 78 may extend across, or intersect, lower stiffening ribs 74. Upper and lower stiffening ribs 72, 74 provide additional stiffness to carrier housing 10 and are configured as heat sinks to dissipate heat generated by components within center housing 12 and pinion nose 18.

Figure 3:
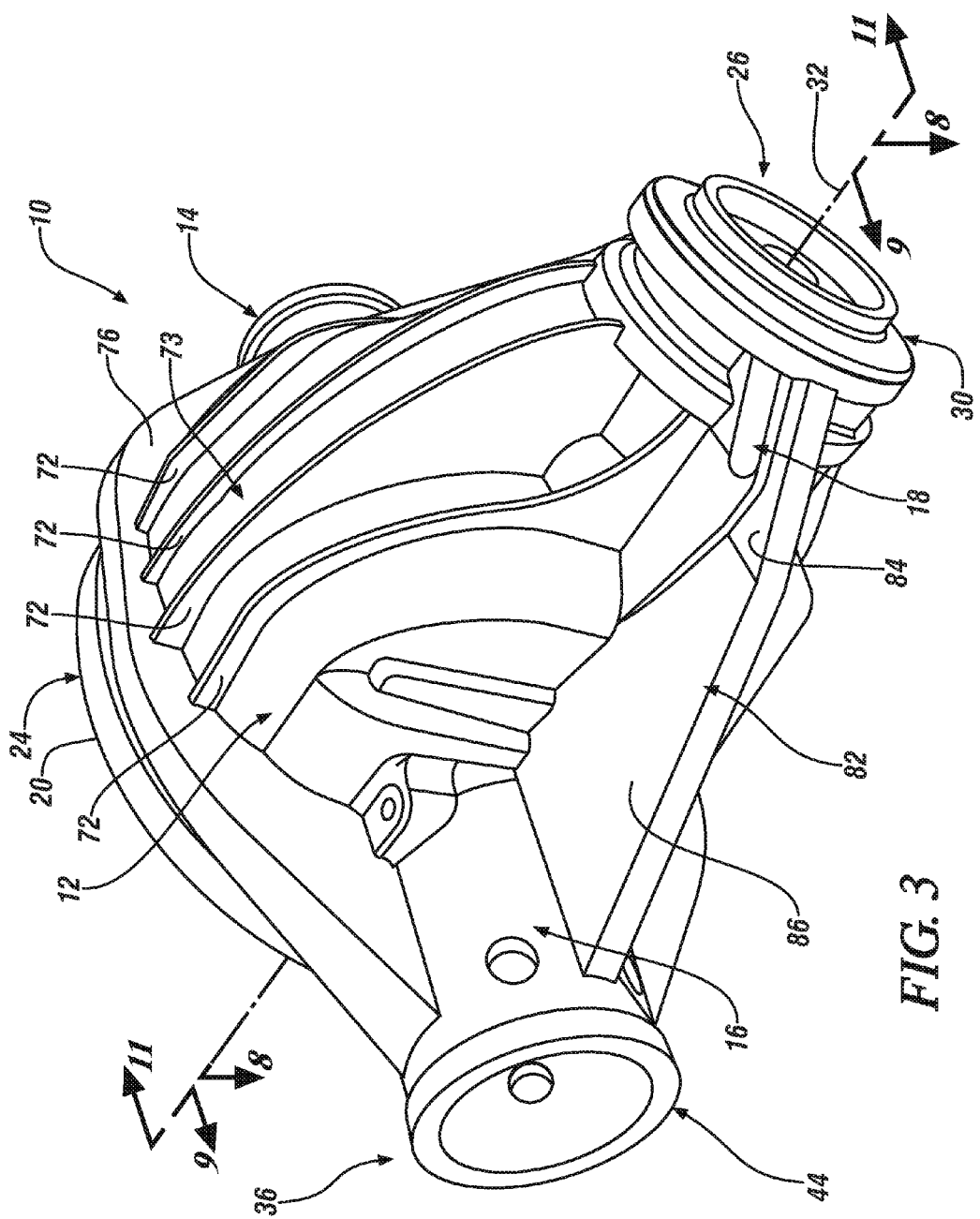

With reference to FIGS. 1, 3, and 4, upper radial web 76 is formed on and extends from axle tubes 14, 16 and radially from center housing upper face 73. Upper radial web 76 extends from and between carrier housing left side 34 to carrier housing right side 36 parallel to or substantially parallel to axle axis 42, which is perpendicular to or generally perpendicular to central axis 32.

With reference to FIGS. 1, 2, and 5, lower radial web 78 is formed on and extends from axle tubes 14, 16 and radially from center housing lower face 75. Lower radial web 78 may extend from axle tubes 14, 16 at a location diametrically opposed from upper radial web 76. Lower radial web 78 extends from and between carrier housing left side 34 to carrier housing right side 36 parallel to or substantially parallel to axle axis 42. Upper and lower radial webs 76, 78 prevent vertical deflection (i.e., in a direction generally orthogonal to central axes 32 and 42), prevent fore/aft deflection (i.e., in a direction generally parallel to central axis 32), and provide additional stiffness to carrier housing 10.

Figure 6:
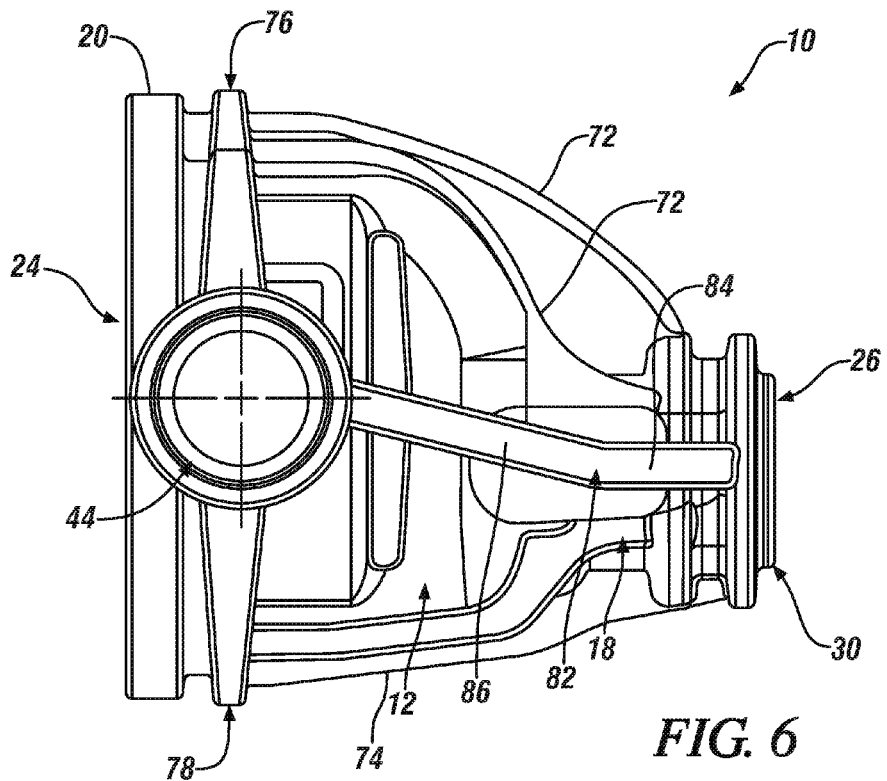
FIG. 6 is a side view of the axle carrier housing shown in FIGS. 1-3.

With reference to FIGS. 1-5, transverse webs 80, 82 are formed on and extend from opposite sides of center housing 12 and pinion nose 18. Transverse web 80 extends angularly from carrier housing front end 26 to axle carrier housing left side 34 in a plane substantially parallel to central axes 32 and 42. Similarly, transverse web 82 extends angularly from carrier housing front end 26 to axle carrier housing right side 36. As shown in FIGS. 1 and 6, each transverse web 80, 82 includes a first portion 84 that is parallel to or substantially parallel to central axis 32, and a second portion 86 that is oriented at an angle with respect to central axis 32. As shown in FIGS. 2 and 5, a plurality of channels 88 may be formed in a bottom surface 90 of transverse webs 80, 82. However, only a single channel 88 may be formed therein. Channels 88 are configured to strengthen transverse webs 80, 82. Transverse webs 80, 82 prevent torsional deflection of carrier housing 10 and provide additional stiffness thereto.

Described herein are systems and methods providing a rear axle carrier housing fabricated from aluminum or an alloy thereof. The carrier housing includes a plurality of ribs to add stiffness to the carrier housing and to dissipate heat. A plurality of webs prevents fore/aft deflection, torsional deflection, and vertical deflection. As such, the structural ribbing/webbing and geometric shape enable the aluminum carrier housing to handle high torque and rear vehicle sprung mass while providing substantial housing weight and mass reduction as compared to a typical cast iron carrier housing. Accordingly, a vehicle utilizing the aluminum carrier housing will realize increased fuel efficiency and performance.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. An axle carrier housing comprising:
   a center housing defining a housing rear end, and an internal chamber configured to house a differential gear assembly;
   a pinion nose extending from the center housing to a housing front end, the pinion nose defining a pinion chamber configured to house a pinion shaft assembly, the housing front end defining a shaft opening having a central axis;
   a first axle tube extending from the center housing to a housing first side defining a first axle tube opening having a first axle axis that is generally perpendicular to the central axis;
   a second axle tube extending from the center housing to a housing second side that is opposite the housing first side, the second axle tube defining a second axle tube opening having a second axle axis that is concentric with the first axle axis;
   a first transverse web extending angularly from the pinion nose and the center housing between the housing front end and the housing first side; and
   a second transverse web extending angularly from the pinion nose and the center housing between the housing front end and the housing second side, wherein the first and second transverse webs facilitate preventing torsional deflection of the axle carrier housing and deflection of the axle carrier housing in a fore/aft direction, wherein at least one of the first and second transverse webs include a first portion extending parallel to the central axis and the first axle axis, and a second portion extending at an angle with respect to the central axis.

2. The axle carrier housing of claim 1, wherein the axle carrier housing is fabricated from aluminum or an aluminum alloy.

3. The axle carrier housing of claim 1, wherein the first and second transverse webs extend substantially parallel to the central axis and transverse to the first axle axis.

4. The axle carrier housing of claim 1, further comprising at least one channel formed in a bottom surface of the at least one of the first and second transverse webs.

5. The axle carrier housing of claim 1, further comprising a plurality of upper stiffening ribs extending from an upper face of the pinion nose and the center housing between the housing front end and the housing rear end, the upper stiffening ribs configured to improve stiffness of the axle carrier housing and to dissipate heat generated in the axle carrier housing.

6. The axle carrier housing of claim 1, further comprising a plurality of lower stiffening ribs extending from a lower face of the pinion nose and the center housing between the housing front end and the housing rear end, the lower stiffening ribs configured to improve stiffness of the axle carrier housing and to dissipate heat generated in the axle carrier housing.

7. The axle carrier housing of claim 1, further comprising an upper radial web extending from the center housing, the first axle tube, and the second axle tube between the housing first side and the housing second side, the upper radial web configured to facilitate preventing deflection of the axle carrier housing in the fore/aft direction and in a vertical direction.

8. The axle carrier housing of claim 1, further comprising a lower radial web extending from the center housing, the first axle tube, and the second axle tube between the housing first side and the housing second side, the lower radial web configured to facilitate preventing deflection of the axle carrier housing in the fore/aft direction and in a vertical direction.

9. The axle carrier housing of claim 1, wherein the first axle tube includes an inner surface defining a differential bearing bore configured to press-fittingly receive a differential bearing, the second axle tube having a first wall thickness and a second wall thickness that is different than the first wall thickness.

10. The axle carrier housing of claim 1, wherein the pinion nose includes an inner surface defining a pinion bearing bore configured to press-fittingly receive a pinion bearing, the inner surface defining a first diameter section, a second diameter section having a diameter greater than a diameter of the first section, and a third diameter section having a diameter greater than the diameter of the second section.

11. An axle carrier housing comprising:
    a center housing defining a housing rear end, and an internal chamber configured to house a differential gear assembly;
    a pinion nose extending from the center housing to a housing front end, the pinion nose defining a pinion chamber configured to house a pinion shaft assembly, the housing front end defining a shaft opening having a central axis;
    a first axle tube extending from the center housing to a housing first side defining a first axle tube opening having a first axle axis that is generally perpendicular to the central axis;
    a second axle tube extending from the center housing to a housing second side that is opposite the housing first side, the second axle tube defining a second axle tube opening having a second axle axis that is concentric with the first axle axis;
    a first transverse web extending angularly from the pinion nose and the center housing between the housing front end and the housing first side;
    a second transverse web extending angularly from the pinion nose and the center housing between the housing front end and the housing second side, wherein the first and second transverse webs facilitate preventing torsional deflection of the axle carrier housing and deflection of the axle carrier housing in a fore/aft direction, wherein at least one of the first and second transverse webs include a first portion extending parallel to the first and second central axes, and a second portion extending at an angle with respect to the central axis;
    a plurality of upper stiffening ribs extending from an upper face of the pinion nose and the center housing between the housing front end and the housing rear end, the upper stiffening ribs configured to improve stiffness of the axle carrier housing and to dissipate heat generated in the axle carrier housing;

a plurality of lower stiffening ribs extending from a lower face of the pinion nose and the center housing between the housing front end and the housing rear end, the lower stiffening ribs configured to improve stiffness of the axle carrier housing and to dissipate heat generated in the axle carrier housing;

an upper radial web extending from the center housing, the first axle tube, and the second axle tube between the housing first side and the housing second side, the upper radial web configured to facilitate preventing deflection of the axle carrier housing in the fore/aft direction and in a vertical direction; and a lower radial web extending from the center housing, the first axle tube, and the second axle tube between the housing first side and the housing second side, the lower radial web configured to facilitate preventing deflection of the axle carrier housing in the fore/aft direction and in the vertical direction.

12. The axle carrier housing of claim 11, wherein the axle carrier housing is fabricated from aluminum or an aluminum alloy.

13. The axle carrier housing of claim 11, wherein the first and second transverse webs extend substantially parallel to the central axis and transverse to the first axle axis.

14. The axle carrier housing of claim 11, further comprising at least one channel formed in a bottom surface of the at least one of the first and second transverse webs.

15. The axle carrier housing of claim 11, wherein the first axle tube includes an inner surface defining a differential bearing bore configured to press-fittingly receive a differential bearing, the second axle tube having a first wall thickness and a second wall thickness that is different than the first wall thickness.

16. The axle carrier housing of claim 11, wherein the pinion nose includes an inner surface defining a pinion bearing bore configured to press-fittingly receive a pinion bearing, the inner surface defining a first diameter section, a second diameter section having a diameter greater than a diameter of the first section, and a third diameter section having a diameter greater than the diameter of the second section.

* * * * *